US010011187B2

(12) United States Patent
Cha et al.

(10) Patent No.: US 10,011,187 B2
(45) Date of Patent: Jul. 3, 2018

(54) SERVER FOR PROVIDING BATTERY DISPLAY STATUS OF AN ELECTRIC VEHICLE, AND A DEVICE AND A COMPUTER-READABLE RECORDING MEDIUM FOR SETTING BATTERY DISPLAY STATUS OF AN ELECTRIC VEHICLE

(71) Applicant: HYUNDAI MOTOR COMPANY, Seoul (KR)

(72) Inventors: Kang Ju Cha, Seoul (KR); Yong Ki Lee, Incheon (KR); Jin Young You, Seoul (KR); Jang Yong Lee, Jeollabuk-do (KR); Jae Hoon Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/360,593

(22) Filed: Nov. 23, 2016

(65) Prior Publication Data
US 2017/0282739 A1 Oct. 5, 2017

(30) Foreign Application Priority Data
Apr. 1, 2016 (KR) .......................... 10-2016-0040405

(51) Int. Cl.
*B60L 11/18* (2006.01)
*G07C 5/00* (2006.01)
(Continued)

(52) U.S. Cl.
CPC .......... *B60L 11/1861* (2013.01); *G07C 5/008* (2013.01); *G07C 5/06* (2013.01); *G07C 5/0825* (2013.01)

(58) Field of Classification Search
CPC ...... B60W 40/08; B60W 40/09; B60W 40/10; B60L 11/1861; B60L 11/1857;
(Continued)

(56) References Cited

U.S. PATENT DOCUMENTS 7,013,205 B1* 3/2006 Hafner ................. B60L 11/126
180/165
8,942,875 B2 1/2015 Kusumi et al.
(Continued)

FOREIGN PATENT DOCUMENTS

JP 2013-069227 4/2013
KR 10-2010-0110102 10/2010
(Continued)

*Primary Examiner* — Tan Q Nguyen
(74) *Attorney, Agent, or Firm* — Brinks Gilson & Lione (57) ABSTRACT

The present disclosure relates to a server for providing the battery display status of an electric vehicle based on the results of analysis on an electric vehicle driver's driving data and battery charging data, and a device and computer-readable recording medium for setting the battery display status of an electric vehicle. The battery display status provision server includes: a vehicle information receiver that receives vehicle identification information from a vehicle terminal; a driving data analyzer that retrieves driving data based on the received vehicle identification information and rates the driving pattern by extracting the vehicle driver's driving habits from the retrieved driving data; and a display status setting part that sets the battery display status based on the rated charging pattern and transmits the same to the vehicle terminal.

19 Claims, 8 Drawing Sheets

(51) Int. Cl.
*G07C 5/06* (2006.01)
*G07C 5/08* (2006.01)
*G01C 21/26* (2006.01)

(58) Field of Classification Search
CPC .......... G07C 5/008; G07C 5/06; G01C 21/26; G01C 21/36
USPC ........................................................ 701/123
See application file for complete search history.

(56) References Cited

U.S. PATENT DOCUMENTS

| | | | |
|---|---|---|---|
| 2007/0027593 A1* | 2/2007 | Shah | B60W 50/00 |
| | | | 701/29.4 |
| 2010/0138098 A1 | 6/2010 | Takahara et al. | |
| 2011/0238260 A1* | 9/2011 | Kotani | G06F 21/31 |
| | | | 701/31.4 |
| 2012/0019204 A1* | 1/2012 | Matsuo | B60L 3/12 |
| | | | 320/109 |
| 2012/0296512 A1* | 11/2012 | Lee | B60K 6/48 |
| | | | 701/29.3 |
| 2013/0179057 A1* | 7/2013 | Fisher | B60L 11/1861 |
| | | | 701/117 |
| 2013/0253746 A1* | 9/2013 | Choi | G06Q 50/30 |
| | | | 701/22 |
| 2014/0214321 A1* | 7/2014 | Kawamata | G01C 21/3469 |
| | | | 701/533 |

FOREIGN PATENT DOCUMENTS

| | | |
|---|---|---|
| KR | 10-2013-0008701 | 1/2013 |
| KR | 10-1383261 | 4/2014 |
| KR | 10-2015-0008256 | 1/2015 |

* cited by examiner

SERVER FOR PROVIDING BATTERY DISPLAY STATUS OF AN ELECTRIC VEHICLE, AND A DEVICE AND A COMPUTER-READABLE RECORDING MEDIUM FOR SETTING BATTERY DISPLAY STATUS OF AN ELECTRIC VEHICLE

CROSS-REFERENCE TO RELATED APPLICATION

The present application claims priority to and the benefit of Korean Patent Application No. 10-2016-0040405 filed in the Korean Intellectual Property Office on Apr. 1, 2016, the entire contents of which are incorporated herein by reference.

BACKGROUND (a) Field of the Disclosure

The present disclosure relates to a server for providing a battery display status of an electric vehicle based on the results of an analysis on an electric vehicle driver's driving data and battery charging data, and a device and a computer-readable recording medium for setting the battery display status of an electric vehicle.

(b) Description of the Related Art

With the rise in pollutant emissions from road vehicles, driven by the increasing use of vehicles, there has been fast growing interest in zero-emission vehicles (ZEV), with automobile exhaust fumes being one of the main causes of air pollution.

The zero-emission vehicles include electric vehicles whose batteries can be charged externally with AC or DC power and which can be driven on battery power. The main drawbacks with electric vehicles are that there is only a handful of electricity charging stations compared to gas stations and that the battery charging time is considerably long compared to filling up with gas. Moreover, if there isn't enough battery charge, drivers can be concerned that they would run out of charge before reaching the destination. Also, reducing the motor's output for battery protection can cause drivers to complain about the vehicle's driving condition. In addition, it can be difficult for drivers to intuitively recognize battery charge or remaining battery charge.

The above information disclosed in this Background section is only for enhancement of understanding of the background of the invention and therefore it may contain information that does not form the prior art that is already known in this country to a person of ordinary skill in the art.

SUMMARY

The present disclosure has been made in an effort to provide a server for providing the battery display status of an electric vehicle based on the results of an analysis on an electric vehicle driver's driving data and battery charging data, and a device and a computer-readable recording medium for setting the battery display status of an electric vehicle.

An exemplary form of the present disclosure may be used to achieve other aspects that are not stated in detail, other than the aspects described above.

An exemplary form of the present disclosure provides a server for providing the battery display status of an electric vehicle, the server including: a vehicle information receiver configured to receive vehicle identification information from a vehicle terminal; a driving data analyzer configured to retrieve driving data based on the received vehicle identification information and to rate the driving pattern by extracting the vehicle driver's driving habits from the retrieved driving data; and a display status setting part configured to set the battery display status based on the rated charging pattern and to transmit the same to the vehicle terminal.

The server may further include a driving data database configured to store data including one or more of the following: the dates the vehicle was driven, driving time, driving distance, number of accelerations and decelerations, and battery usage.

The driving data analyzer may calculate mileage per trip and battery consumption per unit distance based on the retrieved driving data and compare the calculation results with preset thresholds to determine the driving distance and driving mode and rate the driving pattern.

The server may further include a charging data analyzer configured to retrieve charging data based on the received vehicle identification information and to rate the charging pattern by extracting the vehicle driver's charging habits from the retrieved charging data, wherein the display status setting part may set the battery display status based on the rated driving pattern and the rated charging pattern and transmit the same to the vehicle terminal.

The server may further include a charging data database configured to store data including one or more of the following: the amount of battery power per charge, the charging method, and the remaining battery charge upon completion of charging. The charging data analyzer may rate the charging pattern by extracting the number of times the battery is overcharged or discharged from the retrieved charging data and comparing the extracted number with a preset threshold.

The vehicle information receiver may further receive information such as the battery's internal resistance and degradation level from the vehicle terminal, and the device may further include a status information analyzer that rates the battery status by extracting the degree of aging of the battery based on the results of comparing the battery's internal resistance and degradation level with preset thresholds, wherein the display status setting part may set the battery display status based on the rated driving pattern and the rated battery status.

The vehicle information receiver may further receive remaining battery charge information and location information from the vehicle terminal, and the device may further include a drivable distance calculator configured to calculate drivable distance based on the received remaining battery charge information, to calculate the distance to the nearest charging station from the vehicle based on the received location information, and to compare the calculated drivable distance with the distance to the charging station, wherein the display status setting part may set the battery display status based on the rated driving pattern and the result of comparing the calculated drivable distance with the distance to the charging station.

The battery display status of the vehicle terminal may include a normal mode for outputting remaining battery charge, as set by default in the factory setting for the battery display status, and a custom mode for outputting remaining battery charge by varying the battery display status, wherein, if the battery display status is set to the custom mode, information including at least one of: vehicle location, battery charge, battery's internal resistance, or battery's degradation level may be collected and transmitted to the server. The display status setting part may indicate remaining battery charge on a numerical scale, vary the scale range, narrow down the scale range, or select a portion of the scale range.

Another exemplary form of the present disclosure provides a device for setting the battery display status of an electric vehicle, the device including: a driving data database configured to store driving data including at least one of: the dates the vehicle was driven, driving time, driving distance, number of accelerations and decelerations, or battery usage; a display status input part configured to receive from the vehicle driver a custom mode command for outputting remaining battery charge by varying the battery display status; a driving data analyzer configured to rate the driving pattern by extracting the vehicle driver's driving habits from the stored driving data; and a display status setting part configured to set the battery display status based on the rated driving pattern.

The driving data analyzer may calculate mileage per trip and battery consumption per unit distance based on the stored driving data and compare the calculation results with preset thresholds to determine the driving distance and driving mode and rate the driving pattern.

The device may further include: a charging data database configured to store charging data including at least one of: the amount of battery power per charge, the charging method, or the remaining battery charge upon completion of charging; and a charging data analyzer configured to rate the charging pattern by extracting the vehicle driver's charging habits from the stored charging data, wherein the display status setting part may set the battery display status based on the rated driving pattern and the rated charging pattern.

The charging data analyzer may rate the charging pattern by extracting the number of times the battery is overcharged or discharged from the stored charging data and comparing the extracted number with a preset threshold. The device may further include: a vehicle information collector configured to collect information such as the battery's internal resistance and degradation level upon receiving a custom mode command; and a status information analyzer configured to rate the battery status by extracting the degree of aging of the battery based on the results of comparing the battery's internal resistance and degradation level with preset thresholds, wherein the display status setting part may set the battery display status based on the rated driving pattern and the rated battery status.

The device may further include: a vehicle information collector configured to collect remaining battery charge information and location information upon receiving a custom mode command; and a drivable distance calculator configured to calculate drivable distance based on the received remaining battery charge information, to calculate the distance to the nearest charging station from the vehicle based on the received location information, and to compare the calculated drivable distance with the distance to the charging station, wherein the display status setting part may set the battery display status based on the rated driving pattern and the result of comparing the calculated drivable distance with the distance to the charging station.

The display status setting part may indicate remaining battery charge on a numerical scale, vary the scale range, narrow down the scale range, or select a portion of the scale range.

Yet another exemplary form of the present disclosure provides a computer-readable recording medium which stores a program executable by a battery display status setting device electrically connected to a dashboard in an electric vehicle, the computer-readable recording medium including: the function of storing driving data including one or more of the following: the dates the vehicle was driven, driving time, driving distance, number of accelerations and decelerations, and battery usage; the function of receiving from the vehicle driver a custom mode command for outputting remaining battery charge by varying the battery display status; the function of rating the driving pattern by extracting the vehicle driver's driving habits from the stored driving data; and the function of setting the battery display status based on the rated driving pattern.

The computer-readable recording medium may further include: the function of storing charging data including one or more of the following: the amount of battery power per charge, the charging method, and the remaining battery charge upon completion of charging; and the function of rating the charging pattern by extracting the vehicle driver's charging habits from the stored charging data, wherein the display status setting function may include setting the battery display status based on the rated driving pattern and the rated charging pattern.

The computer-readable recording medium may further include: the function of collecting information such as the battery's internal resistance and degradation level upon receiving a custom mode command; and the function of rating the battery status by extracting the degree of aging of the battery based on the results of comparing the battery's internal resistance and degradation level with preset thresholds, wherein the display status setting function may include setting the battery display status based on the rated driving pattern and the rated battery status.

In forms of the present disclosure, the battery display status may be varied based on the driver's driving habits and battery charging habits. Furthermore, the driver may intuitively recognize remaining battery charge, thereby alleviating range anxiety and making driving safer.

DETAILED DESCRIPTION

In the following detailed description, only certain exemplary forms of the present disclosure have been shown and described, simply by way of illustration. As those skilled in the art would realize, the described forms may be modified in various different ways, all without departing from the spirit or scope of the present disclosure. Accordingly, the drawings and description are to be regarded as illustrative in nature and not restrictive. Like reference numerals designate like elements throughout the specification. Further, detailed descriptions of well-known technologies are not provided.

In addition, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In this specification, the term "battery" refers to a battery or storage battery that stores and supplies electric energy for running the motor in an electric vehicle.

Figure 1:
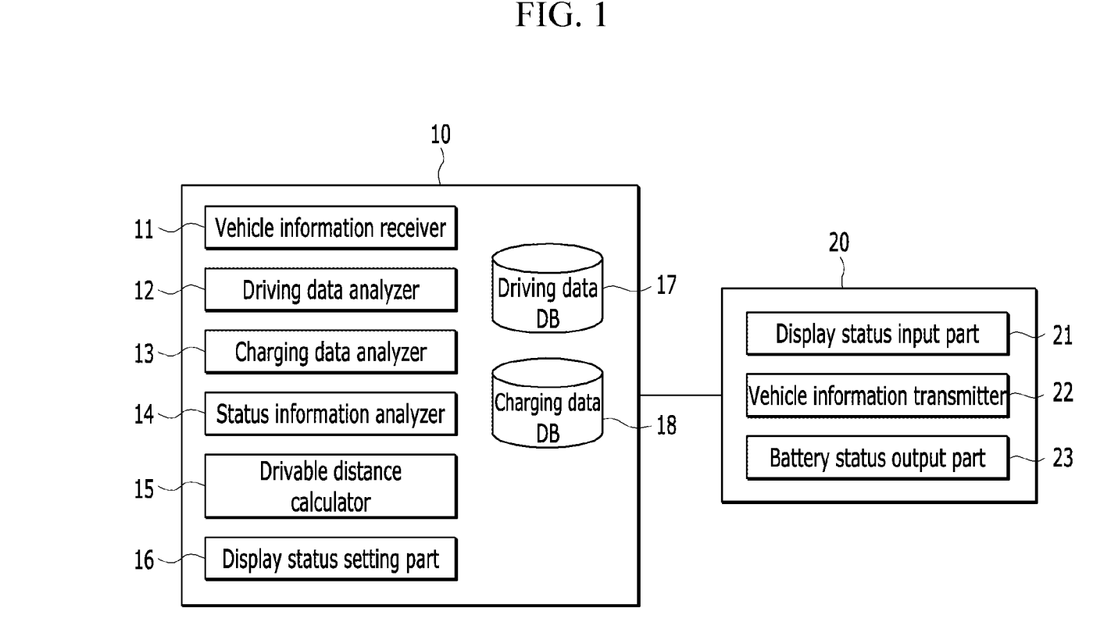
FIG. 1 shows one form of a configuration of a battery display status provision system according.

FIG. 1 shows one form of a configuration of a battery display status provision system.

In FIG. 1, a battery display status provision server 10 is connected to a vehicle terminal 20 via a radio communication network, and includes a vehicle information receiver 11, a driving data analyzer 12, a charging data analyzer 13, a status information analyzer 14, a drivable distance calculator 15, a display status setting part 16, a driving data database (hereinafter, 'driving data DB') 17, and a charging data database (hereinafter, 'charging data DB') 18.

The vehicle information receiver 11 receives vehicle information from the vehicle terminal 20. Here, the vehicle information includes vehicle location information, identification information, battery charge information, and battery status information.

The driving data analyzer 12 retrieves driving data matching the vehicle identification information received by the vehicle information receiver 11 from the driving data DB 17, analyzes the retrieved driving data, and rates the driving pattern of the driver of the vehicle where the vehicle terminal 20 is installed. In some forms of the present disclosure, the driving data analyzer 12 calculates mileage per trip and battery consumption per unit distance based on the retrieved driving data. Afterwards, the driving data analyzer 12 compares the calculation results with preset thresholds to determine the driving distance and driving mode and rate the driving pattern of the vehicle driver. For instance, if the result of analysis of the driving data shows that the vehicle driver usually drives a short distance or drives in Eco mode that can improve the fuel efficiency of the vehicle, the driving pattern may be rated Grade 1. If the result of analysis of the driving data shows that the vehicle driver usually drives a long distance or drives in fast Dynamic mode, the driving pattern may be rated Grade 5.

The charging data analyzer 13 retrieves charging data matching the vehicle identification information received by the vehicle information receiver 11 from the charging data DB 18, analyzes the retrieved charging data, and rates the charging pattern of the driver of the vehicle where the vehicle terminal 20 is installed. In some forms of the present disclosure, the charging data analyzer 13 judges the driver's battery charging habits and rates the charging pattern, based on the result of analysis of the retrieved charging data. Here, the charging data includes at least one of: the amount of battery power per charge, the charging method (slow charging or fast charging), or the remaining battery charge upon completion of charging. For instance, it is determined whether the battery is overcharged or not based on the remaining battery charge upon completion of charging, and the rated charging pattern may be rated Grade 1 if the driver has a history of overcharging or Grade 5 if the number of times the battery is overcharged is greater than or equal to a preset threshold. Also, the charging pattern rating may be adjusted depending on the usual charging method used or whether there is a history of battery discharge or not.

The status information analyzer 14 rates the battery status by analyzing the battery status information received by the vehicle information receiver 11. Here, the battery status information includes information such as current battery charge, internal resistance, degradation level, etc. In forms of the present disclosure, the status information analyzer 14 may rate the battery status by extracting the degree of aging of the battery based on the results of comparing the internal resistance and degradation level with preset thresholds. For example, the battery status may be rated High if the battery's internal resistance and degradation level are below the thresholds, Medium if they are equal to the thresholds, or Low if they are above the thresholds.

The drivable distance calculator 15 calculates the distance (hereinafter, 'drivable distance') the vehicle can be driven, based on current battery charge information received by the vehicle information receiver 11. Also, the drivable distance calculator 15 calculates the distance from the current location of the vehicle to the nearest charging station based on location information received by the vehicle information receiver 11.

The display status setting part 16 sets the battery display status, based on one or more of the following: the driving pattern rated by the driving data analyzer 12, the charging pattern rated by the charging data analyzer 13, the battery status rated by the status information analyzer 14, and the result of determination by the drivable distance calculator 15, and transmits it to the vehicle terminal 20.

The driving data DB 17 stores data including at least one of: the dates the driver drove the vehicle, driving time (time between turn-on and turn-off), driving distance, number of accelerations and decelerations, or battery usage which are recorded in the battery display status provision server 10. Data including at least one of: the driving time, driving distance, number of accelerations and decelerations, or battery usage may be transmitted via the vehicle terminal 20 or the vehicle driver's mobile terminal.

The charging data DB 18 stores data including at least one of: the amount of battery power the driver gets per charge, the charging method, or the remaining battery charge upon completion of charging which are recorded in the battery display status provision server 10. Data including at least one of: the amount of battery power per charge, the charging method, or the remaining battery charge upon completion of charging may be transmitted via the vehicle terminal 20 or the vehicle driver's mobile terminal.

The vehicle terminal 20 transmits vehicle information to the battery display status provision server 10 and outputs remaining battery charge based on the battery display status transmitted from the battery display status provision server 10, and includes a display status input part 21, a vehicle information transmitter 22, and a battery status output part 23. The vehicle terminal 21 may be implemented as a telematics terminal.

The display status input part 21 receives a battery status output mode input from the driver. Here, the battery status output mode includes a normal mode for outputting remaining battery charge, as set by default in the factory setting for the battery display status, and a custom mode for outputting remaining battery charge by varying the battery display status.

Upon receiving a custom mode command through the display status input part 21, the vehicle information transmitter 22 transmits vehicle information to the battery display status provision server 10. For example, the vehicle information transmitter 22 may collect vehicle location information using the vehicle's GPS (Global Positioning System)

module, collect information such as battery charge, internal resistance, and degradation level using an IBS (Intelligent Battery Sensor), and transmit the collected information such as location, battery charge, internal resistance, and degradation level, along with vehicle identification information, to the battery display status provision server 10.

The battery status output part 23 outputs remaining battery charge depending on the battery display status set by the battery display status provision server 10. Moreover, upon receiving a normal mode command through the display status input part 21, the battery status output part 23 outputs remaining battery charge depending on a preset battery display status.

Figure 2:
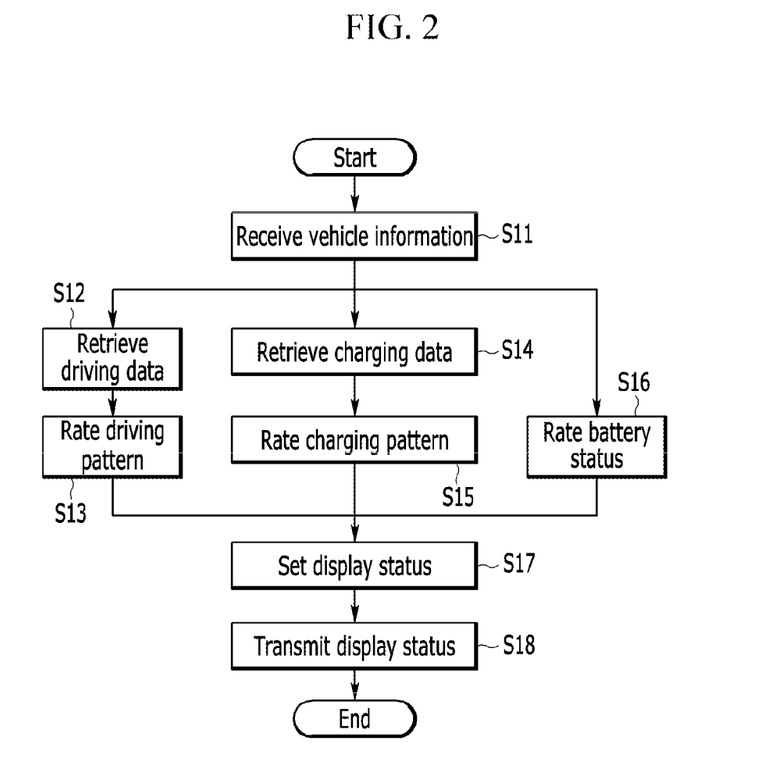
FIG. 2 shows a battery display status provision method using FIG. 1.

FIG. 2 shows a battery display status provision method using FIG. 1.

The battery display status provision server 10 receives vehicle location information, identification information, battery charge information, and battery status information from the vehicle terminal 20 through the vehicle information receiver 11 (S11).

Afterwards, the driving data analyzer 12 retrieves driving data matching the identification information received in the step S11 through the driving data analyzer 12 from the driving data DB 17 (S12), and rates the driving pattern based on the driver's driving habits by analyzing the results of the retrieval in the step S12 (S13). Specifically, the driving data analyzer 12 may calculate mileage per trip and electricity consumption per unit distance by retrieving driving time, driving distance, and battery consumption in the step S12. Afterwards, the calculated average mileage and electricity consumption of the driver may be compared with preset thresholds to extract their driving habits and rates the driving pattern.

Moreover, the charging data analyzer 13 retrieves charging data matching the identification information received in the step S11 from the charging data DB 18 (S14), and rates the charging pattern based on the driver's charging habits by analyzing the results of the retrieval in the step S14 (S15). Specifically, the charging pattern may be rated based on whether the driver has any history of overcharging or battery discharge retrieved in the step S14 or based on the battery charging method. Here, the more times the battery is overcharged or discharged, the lower grade the charging pattern may be rated.

Furthermore, the status information analyzer 14 analyzes the battery status information received in the step S11 to determine how much the battery is aged and rate the battery status (S16). Specifically, the battery status may be rated by comparing the battery degradation level received in the step S11 and the driving time retrieved in the step S12 with the stored degradation level relative to mileage.

Afterwards, the display status setting part 16 sets a battery status display strategy based on one or more of the following: the driving pattern rated in the step S13, the charging pattern rated in the step S15, and the battery status rated in the step S16 (S17), and transmits the display status set in the step S17 to the vehicle terminal 20 (S18). The display strategy setting method shown in the step S17 will be described in detail below with reference to FIGS. 3 to 6.

FIG. 3 to FIG. 6 are battery display status setting screen images according to exemplary forms of the present disclosure.

Figure 3:
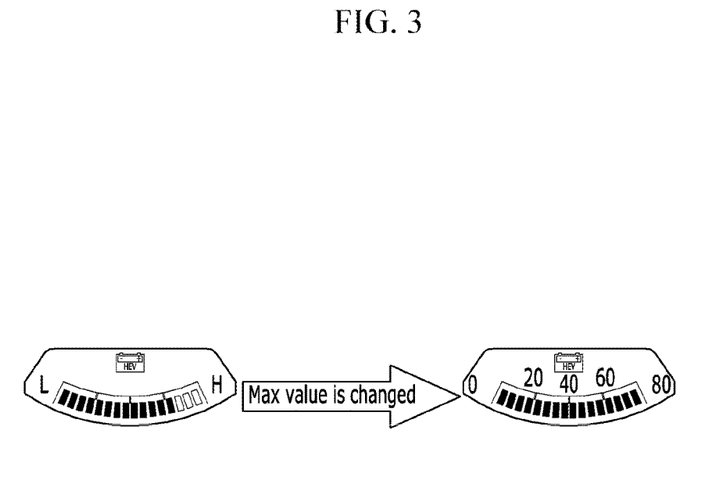
FIG. 3 is one form of a battery display status setting screen image.

FIG. 3 is a screen image that is configured to indicate the remaining battery charge, which is previously indicated on a scale of L to H, on a scale of 0 to 80, if the remaining battery charge is greater than or equal to a preset first threshold and the vehicle driver usually drives a long distance in Eco mode (for example, Grade 1 driving pattern). Here, the maximum value is equal to the remaining battery charge, and the first threshold may be set to be about 80% of the total battery capacity.

In FIG. 3, the remaining battery charge is precisely indicated on a numerical scale so as to emphasize a sufficient remaining battery charge while driving. This may lead the driver to drive further until the remaining battery charge reaches the minimum value required for driving the vehicle.

Figure 4:
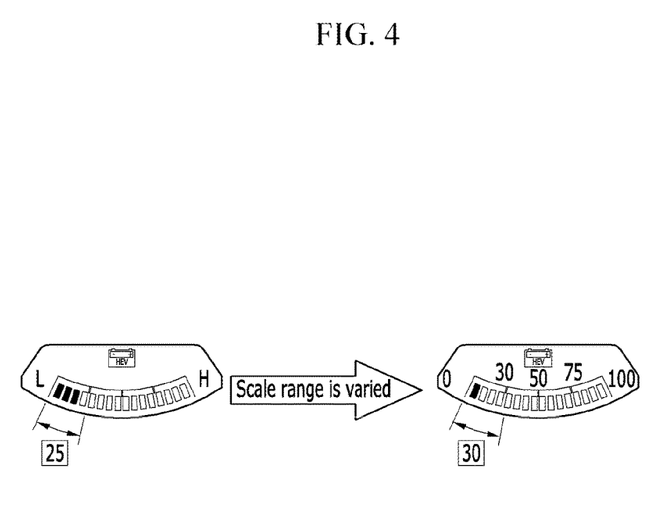
FIG. 4 is another form of a battery display status setting screen image.

FIG. 4 is a screen image that is configured to indicate the remaining battery charge, which is previously indicated on a scale of L to H divided by 25, on a scale of 0 to 100 divided by 30, if the remaining battery charge is below a preset second threshold. Here, the second threshold is the minimum remaining battery charge, and may be preset at a minimum value required for driving the vehicle. Moreover, the lower grade the charging pattern or battery status is rated, the wider the scale range is.

In FIG. 4, the remaining battery charge is precisely indicated on a numerical scale, and the region occupied by the current remaining battery charge in the total battery is expanded by increasing the number of the scale, thereby emphasizing the lack of remaining battery charge. Due to this, the driver may be led to charge the battery before the battery runs out.

Figure 5:
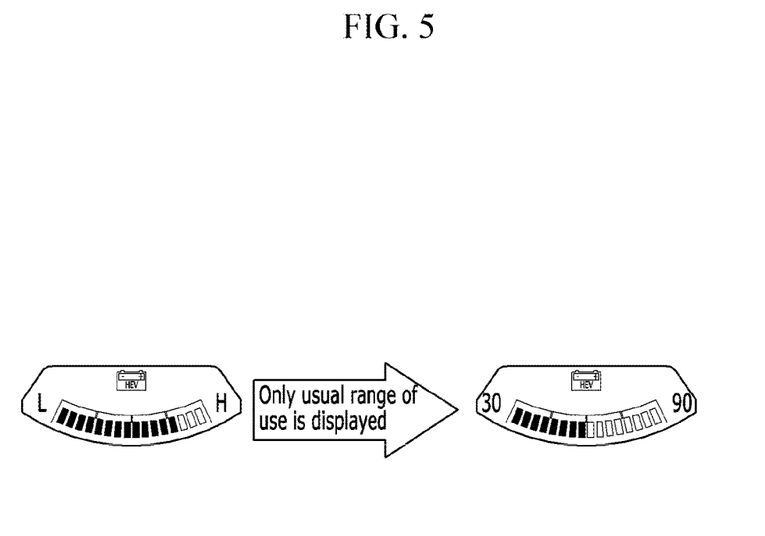
FIG. 5 is yet another form of a battery display status setting screen image.

FIG. 5 is a screen image that is configured to precisely indicate the remaining battery charge, which is previously indicated on a scale of L to H, on a numerical scale that corresponds to a usual range of battery use. Here, the lowest value in the usual range of battery use is the minimum value required for driving the vehicle, and the highest value in the usual range of battery use is the battery capacity (or remaining battery charge after completion of charging).

In FIG. 5, only the usual range of battery use is precisely indicated on a numerical scale so as to improve the driver's recognition of remaining battery charge.

Figure 6:
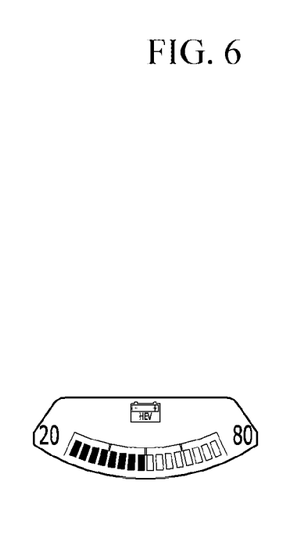
FIG. 6 is a further form of a battery display status setting screen image.

FIG. 6 shows that, if the degree of battery aging and the number of times of discharging exceed preset threshold values, a battery capacity range in which the vehicle driving is stable, i.e., a stability range, is precisely indicated on a numerical scale to prevent battery aging and discharge.

Figure 7:
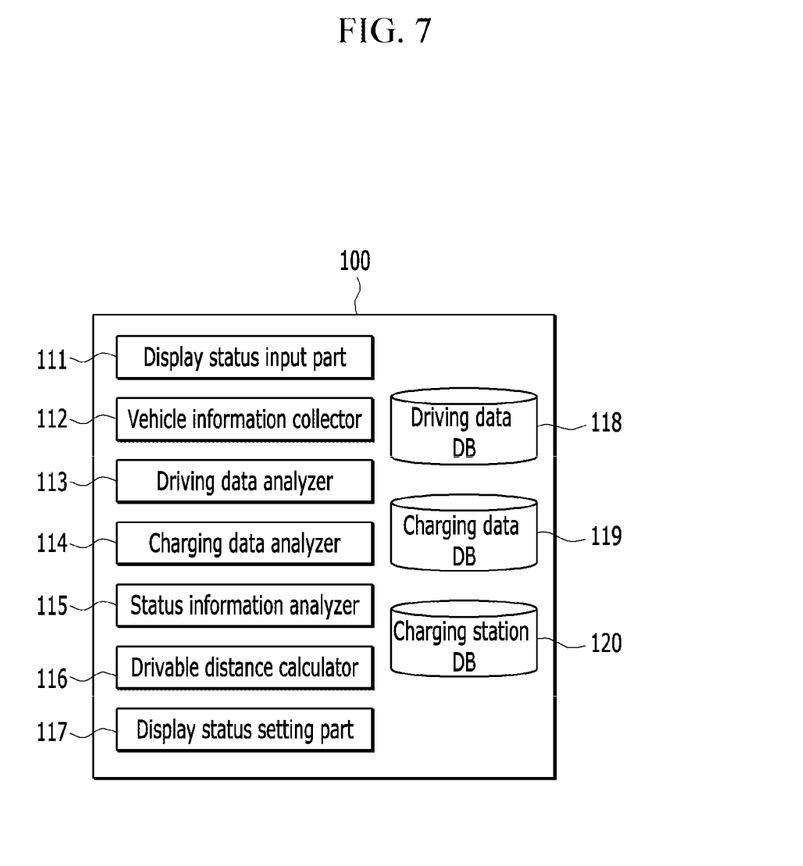
FIG. 7 shows the configuration of a device for setting a battery display status.

FIG. 7 shows the configuration of a device for setting a battery display status according to an exemplary embodiment of the present invention.

The battery display status setting device 100 of FIG. 7 is connected to a dashboard installed in the vehicle and outputs remaining battery charge, and includes a display status input part 111, a vehicle information collector 112, a driving data analyzer 113, a charging data analyzer 114, a status information analyzer 115, a drivable distance calculator 116, a display status setting part 117, a driving data database (hereinafter, 'driving data DB') 118, and a charging data database (hereinafter, 'charging data DB') 119, and a charging station information (hereinafter, 'charging station information DB') 120.

The display status input part 111 receives a battery status output mode input from the driver. Here, the battery status output mode includes a normal mode for outputting remaining battery charge, as set by default in the factory setting for the battery display status, and a custom mode for outputting remaining battery charge by varying the battery display status.

Upon receiving a custom mode command through the display status input part 111, the vehicle information collector 112 collects vehicle information. In some forms of the present disclosure, the vehicle information collector 112 may collect vehicle location information using the vehicle's GPS (Global Positioning System) module and collect information such as battery charge, internal resistance, and degradation level using an IBS (Intelligent Battery Sensor).

Upon receiving a custom mode command through the display status input part 111, the driving data analyzer 113 rates the driving pattern by analyzing the vehicle's driving data stored in the driving data DB 118

In some forms of the present disclosure, the driving data analyzer 113 may calculate mileage per trip and battery consumption per unit distance and compare the calculation results with preset thresholds to determine the driving distance and driving mode and rate the driving pattern.

Upon receiving a custom mode command through the display status input part 111, the charging data analyzer 114 rates the charging pattern by analyzing the vehicle's charging data stored in the charging data DB 119. In some forms of the present disclosure, the charging data analyzer 114 may judge the driver's battery charging habits and rate the charging pattern, based on information such as the amount of battery power per charge, the charging method (slow charging or fast charging), and the remaining battery charge upon completion of charging.

Upon receiving a custom mode command through the display status input part 111, the status information analyzer 115 rates the battery status based on battery status information collected by the vehicle information collector 112. In forms of the present disclosure, the status information analyzer 115 may rate the battery status by extracting the degree of aging of the battery based on the results of comparing the collected information such as battery charge, internal resistance and degradation level with preset thresholds.

The drivable distance calculator 116 calculates drivable distance based on the battery charge information collected by the vehicle information collector 112, calculates the distance from the current location of the vehicle to the nearest charging station, and determines whether the drivable distance is longer or shorter than the distance to the charging station.

The display status setting part 117 sets the battery display status based on one or more of the following: the driving pattern rated by the driving data analyzer 113, the charging pattern rated by the charging data analyzer 114, the battery status rated by the status information analyzer 115, and the result of determination by the drivable distance calculator 116. In forms of the present disclosure, the display status setting part 117 may indicate remaining battery charge on a numerical scale, vary the scale range, narrow down the scale range, or select a portion of the scale range.

The driving data DB 118 stores data including one or more of the following: the dates the vehicle was driven, driving time (time between turn-on and turn-off), driving distance, number of accelerations and decelerations, and battery usage.

The charging data DB 119 stores data including one or more of the following: the amount of battery power the vehicle gets per charge, the charging method, and the remaining battery charge upon completion of charging.

The charging station information DB 120 stores information related to the locations, phone numbers, and additional services of electric car charging stations. Moreover, the charging station information DB 120 may receive and store charging and waiting information transmitted in real time from an electric car charging station control center.

Figure 8:
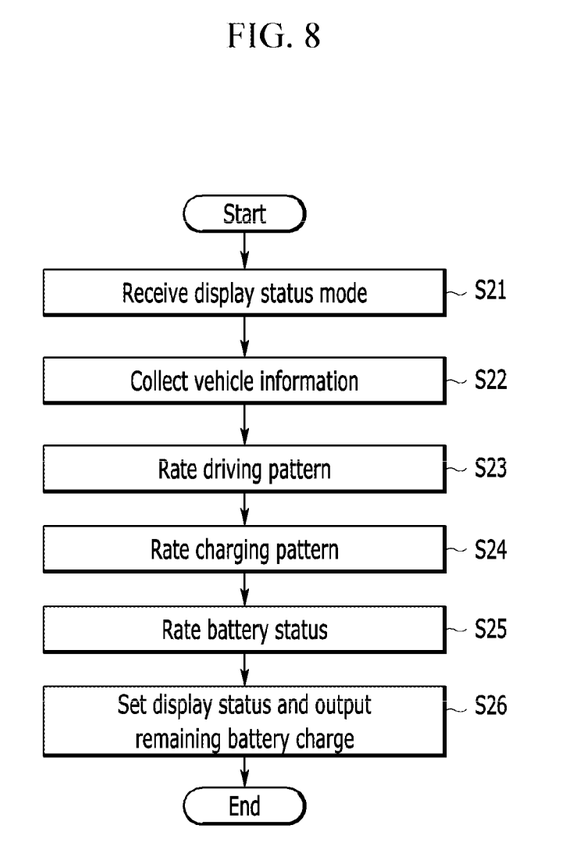
FIG. 8 shows a battery display status setting method using FIG. 7.

FIG. 8 shows a battery display status setting method using FIG. 7.

First off, a battery status output mode is received from the driver through the display status input part 111 (S21).

Upon receiving a custom mode command in the step S21, the vehicle information collector 112 collects information such as vehicle location, battery charge, internal resistance, degradation level, etc. (S22).

Then, the driving data analyzer 113 calculates mileage per trip and battery consumption per unit distance by analyzing the vehicle's driving data stored in the driving data DB 118, and compares the calculation results with preset thresholds to determine the driving distance and driving mode and rate the driving pattern (S23).

Then, the charging data analyzer 114 judges the driver's battery charging habits and rates the charging pattern, based on information such as the amount of battery power per charge, charging method (slow charging or fast charging), and remaining battery charge upon completion of charging which are stored in the charging information DB 119 (S24).

Then, the status information analyzer 115 rates the battery status corresponding to the degree of aging of the battery, based on the results of comparing the collected information such as battery charge, internal resistance and degradation level with preset thresholds (S25).

Afterwards, the display status setting part 117 sets a battery status display strategy based on the driving pattern rated in the step S23, the charging pattern rated in the step S24, and the battery status rated in the step S25, and outputs the remaining battery charge on the dashboard according to the display strategy setting (S26).

In forms of the present disclosure, the battery display status may be set based on the driver's tendencies and the battery's status by taking into account one or more of the following: the driver's driving habits, the driving behavior, and the degree of aging of the battery. Moreover, readability can be improved by indicating remaining battery charge on a numerical scale and emphasizing a portion of the scale range. Furthermore, the driver's fear that the battery will be depleted before reaching their destination can be alleviated, and the driving stability can be improved.

While the present disclosure has been described in connection with what is presently considered to be practical exemplary forms, it is to be understood that the disclosure is not limited to the disclosed forms, but, on the contrary, is intended to cover various modifications and equivalent arrangements included within the spirit and scope of the appended claims.

DESCRIPTION OF SYMBOLS

10: battery display status provision server,
11: vehicle information receiver
12, 113: driving data analyzer, 13, 114: charging data analyzer
14, 115: status information analyzer,
15, 116: drivable distance calculator
16, 117: display status setting part, 17, 118: driving data database
18, 119: charging data database, 20: vehicle terminal
21: display status input part, 22: vehicle information transmitter
23: battery status output part, 100: battery display status setting device
111: display status input part, 112: vehicle information collector
120: charging station information database

What is claimed is:

1. A server for providing a battery display status of an electric vehicle, the server comprising:

a vehicle information receiver configured to receive vehicle identification information from a vehicle terminal;
a driving data analyzer configured to retrieve driving data based on the received vehicle identification information and to rate the driving pattern by extracting the vehicle driver's driving habits from the retrieved driving data; and
a display status setting part configured to set the battery display status based on the rated driving pattern and transmits the same to the vehicle terminal, wherein the battery display status includes a factory set default normal mode configured to present a remaining battery charge, and a custom mode configured to present a remaining battery charge by modifying the battery display status; and
wherein, when the battery display status is set to the custom mode, information including one or more of the following is collected and transmitted to the server: a vehicle location, a battery charge, a battery's internal resistance, or a battery's degradation level.

2. The server of claim 1, further comprising a driving data database configured. to store data including at least one of: the dates the vehicle was driven, driving time, driving distance, number of accelerations and decelerations, or battery usage.

3. The server of claim 2, wherein the driving data analyzer is configured to calculate mileage per trip and battery consumption per unit distance based on the retrieved driving data and to compare the calculation results with preset thresholds to determine the driving distance and driving mode and rate the driving pattern.

4. The server of claim 1, further comprising a charging data analyzer configured to retrieve charging data based on the received vehicle identification information and to rate the charging pattern by extracting the vehicle driver's charging habits from the retrieved charging data,
wherein the display status setting part is configured to set the battery display status based on the rated driving pattern and the rated charging pattern and to transmit the same to the vehicle terminal.

5. The server of claim 4, further comprising a charging data database configured to store data including at least one of: the amount of battery power per charge, the charging method, or the remaining battery charge upon completion of charging.

6. The server of claim 4, wherein the charging data analyzer is configured to rate the charging pattern by extracting the number of times the battery is overcharged or discharged from the retrieved charging data and comparing the extracted number with a preset threshold.

7. The server of claim 1, wherein
the vehicle information receiver is further configured to receive information such as the battery's internal resistance and degradation level from the vehicle terminal, and
the device further comprises a status information analyzer configured to rate the battery status by extracting the degree of aging of the battery based on the results of comparing the battery's internal resistance and degradation level with preset thresholds,
wherein the display status setting part sets the battery display status based on the rated driving pattern and the rated battery status.

8. The server of claim 1, wherein
the vehicle information receiver is further configured to receive remaining battery charge information and location information from the vehicle terminal, and
the device further comprises a drivable distance calculator that is configured to calculate drivable distance based on the received remaining battery charge information, to calculate the distance to the nearest charging station from the vehicle based on the received location information, and to compare the calculated drivable distance with the distance to the charging station,
wherein the display status setting part is configured to set the battery display status based on the rated driving pattern and the result of comparing the calculated drivable distance with the distance to the charging station.

9. The server of claim 1, wherein the display status setting part is configured to indicate remaining battery charge on a numerical scale, vary the scale range, narrow down the scale range, or select a portion of the scale range.

10. A device for setting a battery display status of an electric vehicle, the device comprising:
a driving data database configure to store driving data including at least one of: dates the vehicle was driven, a driving time, a driving distance, a number of accelerations and decelerations, or a battery usage;
a display status input part configured to receive from the vehicle driver a custom mode command for outputting remaining battery charge by modifying the battery display status;
a driving data analyzer configured to rate the driving pattern by extracting the vehicle driver's driving habits from the stored driving data; and
a display status setting part configured to set the battery display status based on the rated driving pattern.

11. The device of claim 10, wherein the driving data analyzer is configured to calculate mileage per trip and battery consumption per unit distance based on the stored driving data and to compare the calculation results with preset thresholds to determine the driving distance and driving mode and rate the driving pattern.

12. The device of claim 10, further comprising:
a charging data database configured to store charging data including at least one of: the amount of battery power per charge, the charging method, or the remaining battery charge upon completion of charging; and
a charging data analyzer configured to rate the charging pattern by extracting the vehicle driver's charging habits from the stored charging data,
wherein the display status setting part is configured to set the battery display status based on the rated driving pattern and the rated charging pattern.

13. The device of claim 12, wherein the charging data analyzer is configured to rate the charging pattern by extracting the number of times the battery is overcharged or discharged from the stored charging data and comparing the extracted number with a preset threshold.

14. The device of claim 10, further comprising:
a vehicle information collector configured to collect information such as the battery's internal resistance and degradation level upon receiving a custom mode command; and
a status information analyzer configured to rate the battery status by extracting the degree of aging of the battery based on the results of comparing the battery's internal resistance and degradation level with preset thresholds, wherein the display status setting part is configured to set the battery display status based on the rated driving pattern and the rated battery status.

15. The device of claim 10, further comprising:
a vehicle information collector configured to collect remaining battery charge information and location information upon receiving a custom mode command; and
a drivable distance calculator configured to calculate drivable distance based on the received remaining battery charge information, to calculate the distance to the nearest charging station from the vehicle based on the received location information, and to compare the calculated drivable distance with the distance to the charging station,
wherein the display status setting part is configured to set the battery display status based on the rated driving pattern and the result of comparing the calculated drivable distance with the distance to the charging station.

16. The device of claim 10, wherein the display status setting part is configured to indicate remaining battery charge on a numerical scale, vary the scale range, narrow down the scale range, or select a portion of the scale range.

17. A computer-readable recording medium which stores a program executable by a battery display status setting device comprising a processor that is electrically connected to a dashboard in an electric vehicle, the computer-readable recording medium comprising processor executable instructions for:
storing driving data including at least one of: the dates the vehicle was driven, driving time, driving distance, number of accelerations and decelerations, or battery usage;
receiving from the vehicle driver a custom mode command for outputting remaining battery charge by varying the battery display status;
rating the driving pattern by extracting the vehicle driver's driving habits from the stored driving data; and
setting the battery display status based on the rated driving pattern.

18. The computer-readable recording medium of claim 17, further comprising:
the function of storing charging data including at least one of: the amount of battery power per charge, the charging method, or the remaining battery charge upon completion of charging; and
the function of rating the charging pattern by extracting the vehicle driver's charging habits from the stored charging data,
wherein the display status setting function comprises setting the battery display status based on the rated driving pattern and the rated charging pattern.

19. The computer-readable recording medium of claim 17, further comprising:
the function of collecting information such as the battery's internal resistance and degradation level upon receiving a custom mode command; and
the function of rating the battery status by extracting the degree of aging of the battery based on the results of comparing the battery's internal resistance and degradation level with preset thresholds,
wherein the display status setting function comprises setting the battery display status based on the rated driving pattern and the rated battery status.

* * * * *